United States Patent [19]

Schofield

[11] Patent Number: 6,142,640
[45] Date of Patent: Nov. 7, 2000

[54] CREDIT CARD POCKET MIRROR AND MINIATURE BILLBOARD

[76] Inventor: Douglas P. Schofield, 334 University Ave., Apt. #1, Rochester, N.Y. 14607

[21] Appl. No.: 08/807,828

[22] Filed: Feb. 27, 1997

Related U.S. Application Data

[63] Continuation of application No. 08/330,305, Oct. 27, 1997, abandoned, which is a continuation-in-part of application No. 08/056,133, Apr. 30, 1993, abandoned, which is a continuation-in-part of application No. 07/953,924, Sep. 29, 1992, abandoned.

[51] Int. Cl.$^7$ .............................. G02B 5/08; G02B 7/182
[52] U.S. Cl. ........................ 359/838; 359/870; 359/883; 359/884; 428/412; 428/416; 428/457; 428/458; 428/469; 428/542.2; 428/912.2; 283/56
[58] Field of Search ..................... 359/838, 870, 359/871, 883, 884; 283/900, 56, 904; 428/912.2, 913.3, 411.1, 412, 542.2, 416, 457, 458, 469, 472

[56] References Cited

U.S. PATENT DOCUMENTS

| | | | |
|---|---|---|---|
| 2,239,520 | 4/1941 | Gurwood | 428/912.2 |
| 2,582,786 | 1/1952 | Malby | 428/912.2 |
| 3,743,389 | 7/1973 | Stiller et al. | 359/871 |
| 3,912,842 | 10/1975 | Swartz | 428/912.2 |
| 4,024,828 | 5/1977 | Knoll et al. | |
| 4,511,618 | 4/1985 | Duchene et al. | 359/883 |
| 4,605,292 | 8/1986 | McIntosh | 359/870 |
| 4,636,047 | 1/1987 | Green | 359/883 |
| 4,780,372 | 10/1988 | Tracy et al. | 359/883 |
| 4,792,482 | 12/1988 | Leach | 359/883 |
| 4,889,419 | 12/1989 | Kite | 359/838 |
| 5,247,395 | 9/1993 | Martinez | 359/883 |

*Primary Examiner*—Ricky D. Shafer
*Attorney, Agent, or Firm*—Harter, Secrest & Emery LLP; Stephen B. Salai, Esq.; Brian B. Shaw, Esq.

[57] ABSTRACT

A portable mirror suitable for storage in a credit card pocket which includes a generally sheet like flexible shatter resistant body having a reflective surface on one side of said sheet to provide a mirrored surface. The opposite rear unreflective surface of the mirror contains discretionary visible indicia. The mirror is rectangular in shape and has rounded or beveled corners with said mirror being up to 3/32 inches in thickness and having the general size of a credit card. The mirror body is made of a plastic material having a flexibility and elasticity sufficient to allow for repeated bending without breaking or losing its original shape.

21 Claims, 3 Drawing Sheets

6,142,640

CREDIT CARD POCKET MIRROR AND MINIATURE BILLBOARD

CROSS REFERENCE TO RELATED APPLICATIONS

This application is a continuation of application Ser. No. 08/330,305 filed on Oct. 27, 1997, now abandoned, which is a continuation-in-part of application Ser. No. 08/056,133 filed Apr. 30, 1993, now abandoned, which is a continuation-in-part of Ser. No. 07/953,924 filed Sep. 29, 1992 now abandoned.

FIELD OF INVENTION

The present invention relates to a flexible, scratch and shatter resistant mirror having a sheet like body made out of a plastic with an acceptable elasticity to enable the mirror body to snap back to its original position when being flexed during use. Alternatively, the mirror may be made of a plastic without the acceptable ability to snap back, but includes structural means integral with the mirror body in order to provide the necessary snap back characteristics. More specifically the invention relates to a mirror that can be conveniently carried in a man or a woman's credit card pocket, and at the same time provides an effective miniature billboard that increases the aesthetic qualities, adds commercial value and also protects the unreflective surface against scratches and other degradations.

BACKGROUND AND DESCRIPTION OF PRIOR ART

In the past, plastic mirrors have been disclosed in the art, but none have been designed nor are practical to be specifically carried and stored in a man's or woman's credit card pocket. Many plastic mirrors available in the art also contain indicia or logos on the mirrored surface, which interferes with the image in the mirror. In addition, the unreflective surface that prior art mirrors commonly provide is generally inadequate for the retention and/or presentation of indicia.

U.S. Pat. No. 3,743,389 to Stiller discloses a combination of a mirror and transparent case, and specifically teaches the application of desired indicia to the transparent case. U.S. Pat. No. 4,605,292 to Mcintosh discloses magnetic and/or adhesive fixing means contained on the back surface of a mirror, and specifically teaches the application of desired indicia to the mirrored surface.

The structure disclosed in the mirrors described in the above prior art patents with respect to the mirror and case and magnetic and/or adhesive backing means, are unsuitable for storage and carrying in a credit card pocket. Credit card pockets often contain bank cards, and credit cards that have a sensitive magnetic strip that could be ruined by the magnet contained on the back of the mirror such as taught by the Mcintosh patent. This would render this type of mirror unsuitable for use with or around other wallet cards. Mcintosh also describes his mirror as being made out of a suitable plastic such as an acrylic. Acrylic, however, is a very brittle plastic, and when its breaking point is reached, its fracture will create very sharp corners and edges which can become projectiles which could injure the user of the mirror. This type of risk is unacceptable for the user of a mirror that has to withstand wallet bending, inserting, pulling out and the flexing from normal use and user curiosity. Mcintosh does not address or teach the need for his mirror to snap back to original position after being repeatedly bent. It is apparent that the Mcintosh mirror will be attached to the surface of a wall, locker or the like so it does not need to have the ability to snap back to its original position. However, if a credit card pocket mirror does not snap back repeatedly, the image quality will be degraded, ruining the entire mirror. Furthermore, Mcintosh is not concerned with the size of his mirror.

Credit cards have a very standard size, and wallets have been designed to accommodate this size, and even a small mirror close to this size such as 4 inches by 4 inches will not fit into a credit card pocket. Furthermore, the prior art is not concerned about the thickness of their plastic mirrors. In the space of a credit card pocket, thickness is especially important since this mirror will be competing for space with other credit and bank cards. Mcintosh teaches using a magnetic strip and adhesive strip. These features take up an enormous amount of room in the tight confines of a credit card pocket in a wallet. Further evidence that Mcintosh does not have this use in mind is that he does not address the sharpness of the corners of the mirrors by either rounding or beveling them off. A mirror that is to slide in an out of a small credit card pocket needs to have rounded corners or it will catch on the walls of the credit card pocket. Also rounding the corners will allow the mirror to be safely handled by the user. Mcintosh also does not address the fact that plastic mirrors are very soft, and in the crowded confines of a wallet, the reflective surface can easily be scratched, which would call for a need for a scratch or abrasion resistant surface or coating to protect the all important reflective surface. Furthermore, Mcintosh teaches applying indicia to the reflective surface of the mirror which interferes with the reflected image. And at the same time, Mcintosh does not provide a backing that would allow indicia to be printed on it. Mcintosh only concerns himself with an enamel coating to protect the mirror. Enamel coatings do not effectively hold ink. Only a special type of enamel coating will allow ink to be printed on it effectively, and that is an enamel that does not contain a surfactant. But even though the ink will hold to the enamel, the enamel itself can easily be scraped off with something as common as a fingernail, raised lettering of another credit card, a coin, or car keys resulting in the degradation and/or destruction of the indicia. Furthermore, the enamels that are used on the back of the most prior art mirrors are almost always a dull gray which is not especially pleasing to the eye. Therefore, it is clear that Mcintosh never intended for indicia to effectively be applied to the back of a mirror, or for that matter for the mirror to be carried in a credit card pocket.

Stiller's mirror also is unsuitable for storage in a credit card pocket. Stiller relies on a pouch to protect the mirror against scratching. Therefore, if this pouch is lost or discarded, the mirror will be scratched, and in the crowded confines of a credit card pocket, the mirror will soon be degraded to a point where it will become useless. This pouch plus mirror is significantly bulkier to carry around in a wallet than a mirror that can be discretely stored in a credit card pocket. Furthermore, Stiller does not disclose any particular type of material for the mirror body. As previously discussed, certain materials like glass and acrylic are susceptible to breaking and shattering. The selection of the material for the body of the mirror is very important because a mirror carried in the wallet will be in intimate contact with the user. Stiller never mentions a need for this mirror to be shatter proof. Furthermore, Stiller never mentions a need for rounded corners which promote safe handling and ease of storage. Stiller also never addresses the need for the mirror to have a certain degree of flexibility and elasticity which are important properties for a mirror that will be hand held and flexed in a wallet. Most plastics do not have the elasticity or the ability to snap back to the original flat position after being bent repeatedly, and when looking into a mirror, even a very slight bend will be noticeable to the eye. Therefore, a plastic with this property must be used, or alternatively a plastic that includes structural means to enable it to have the necessary snap back characteristics. Stiller relies on the pouch to cushion a blow or shock to the mirror, but if the pouch is lost, then the mirror could severely be damaged. Stiller also mentions putting indicia on the pouch and not the back of the mirror. So if the pouch is lost, then the indicia is also lost. This type of risk is not very appealing to a business man who has bought space on the pouch for his advertising. Stiller fails to disclose a backing that can effectively provide for indicia. It is therefore apparent that Stiller never intended for this mirror to be stored in a credit card pocket, and that he never intended for indicia to be applied on the unreflective surface. Furthermore, men would have a tendency not to use a mirror of the type disclosed by Stiller. Our society dictates that men should not be overly concerned about their appearance, and if a man pulled out this type of mirror with a pouch to go with it, he might appear to be feminine.

It is therefore an object of the present invention to provide for a portable flexible, scratch resistant, shatter resistant mirror, with the ability to snap back to is original position after repeated bending, and which is conveniently designed and sized to fit anywhere a credit card be stored. At the same time the mirror provides an unreflective surface which will provide room for a miniature billboard. The inherent aesthetic characteristics and value of the mirror will be unexpectedly increased as a result of the features of the above described combination.

It is a further objective of the invention to provide a shatter resistant mirror that can be discretely concealed and carried in any standard credit card pocket and which has enough elasticity to snap back to its original position after repeated flexing. The mirror further provides added commercial value and significantly improved aesthetic qualities through an unreflective surface that allows indicia to be adhered or printed on it.

A preferred size for the mirror of the present invention is a width of 2⅛ and a length of 3⅜ inches. However, the majority of credit card pockets will support a mirror having a width size range between 1⅞ and 2¼ inches, and the length size range between 3¼ and 3⅝ inches. A size falling in the range will fit the majority of wallets. Some wallets have unusually large credit card pockets and can accommodate a width of between 1⅞ and 3 inches, and a length between 3¼ to 3¾ inches. The mirror will also crease before it creates sharp edges by fracturing, thus damaging rather than potentially hurting the user and should have continuous straight lines, lacking any notching or indentation.

DETAILED DESCRIPTION OF THE INVENTION

Figure 1:
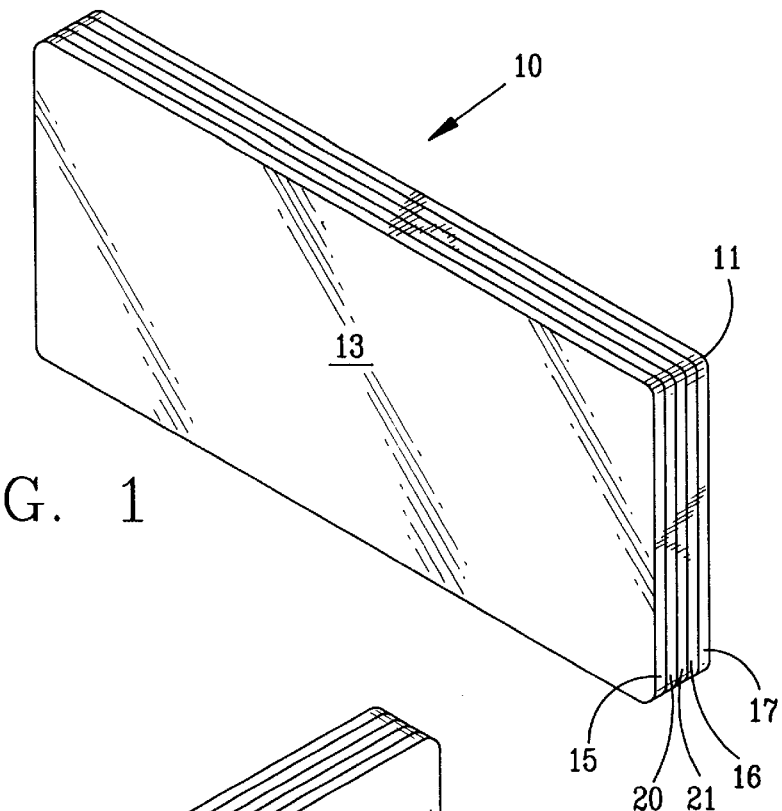
FIG. 1 is a front perspective view of the mirror of the present invention.
Figure 2:
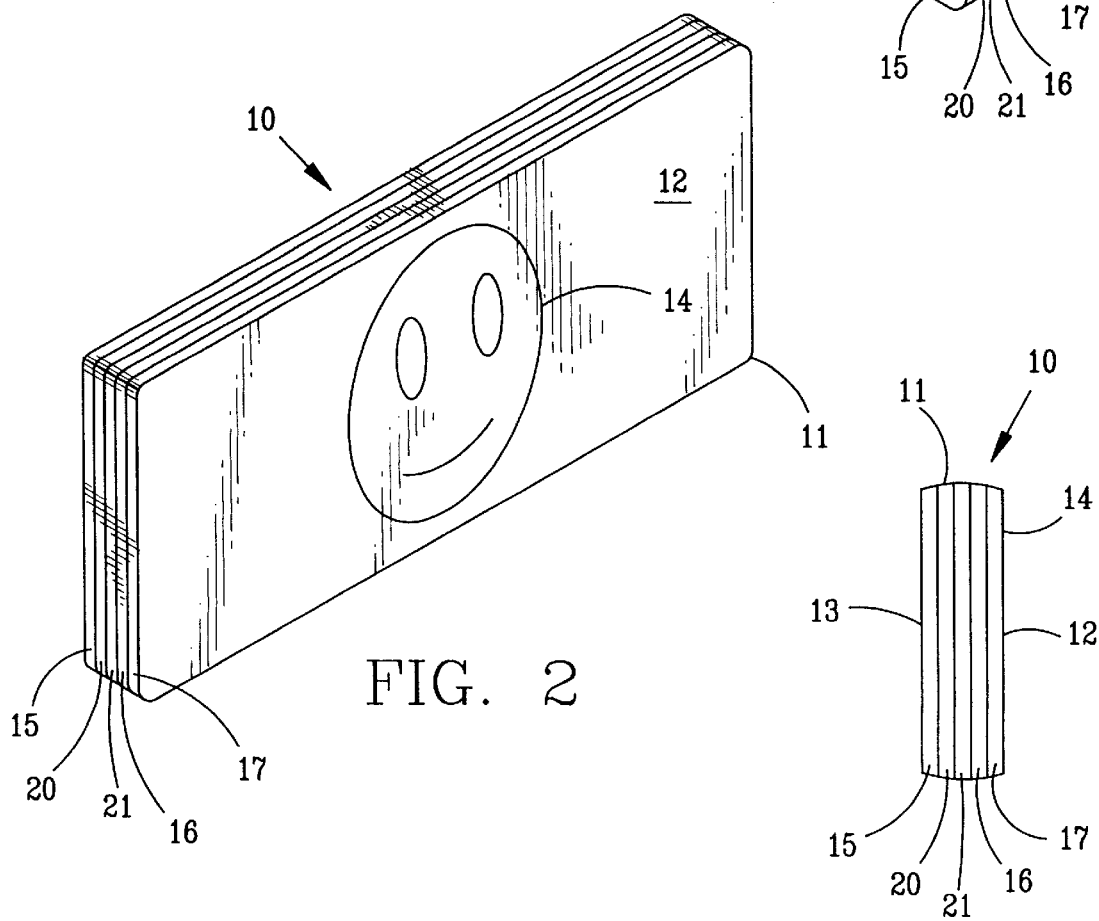
FIG. 2 is a back perspective view of the mirror of FIG. 1.
Figure 3:
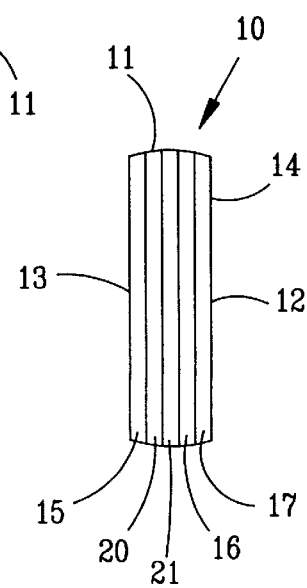
FIG. 3 is a side view of the mirror of FIG. 1.
Figure 4:
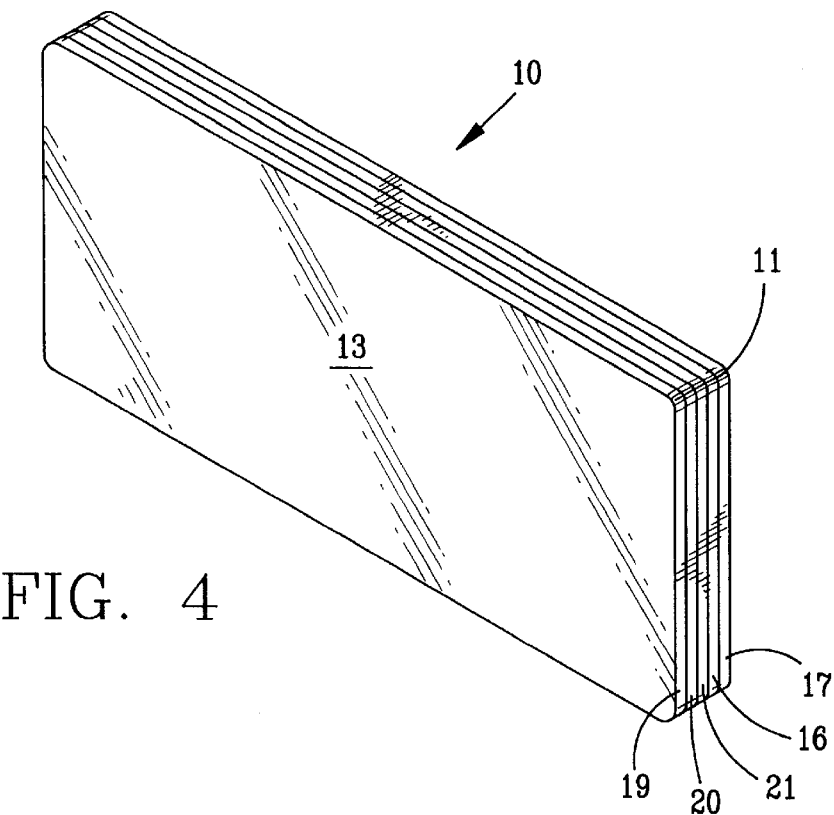
FIG. 4 is a front perspective view of a second embodiment of a mirror of the present invention.
Figure 5:
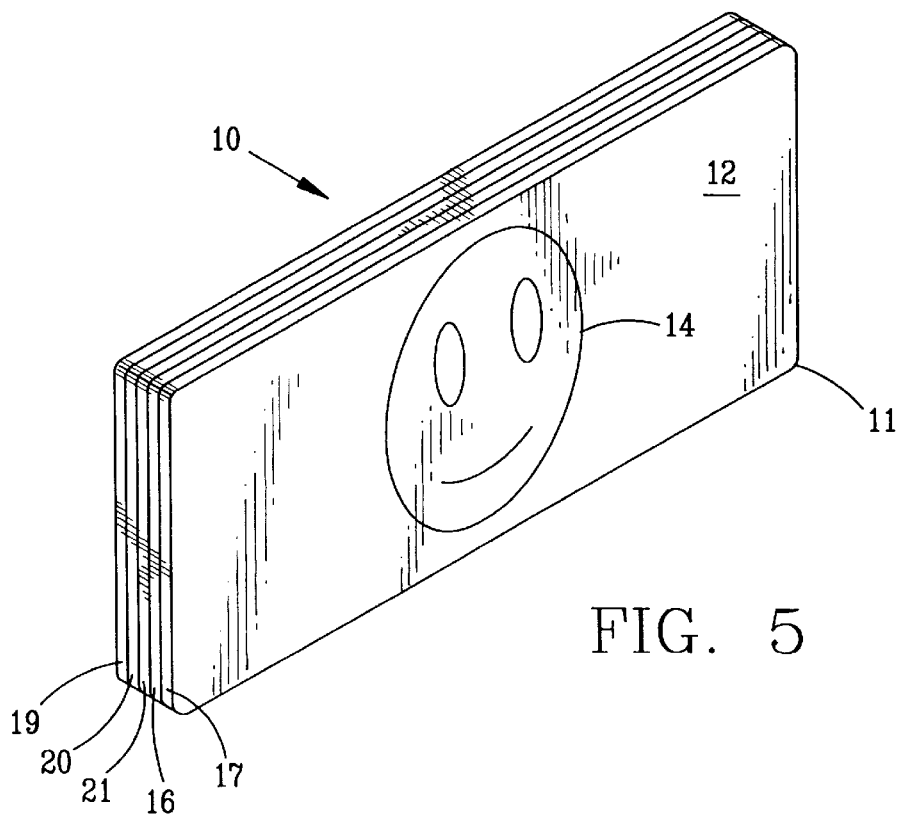
FIG. 5 is a back perspective view of the mirror of FIG. 4.

The present invention is illustrated by the drawings wherein FIGS. 1, 2 and 3 the mirror 10 is depicted having a substantially rectangular body, a front reflective surface 13, and rounded edges 11 and a back unreflective surface 12. The body 15 of the mirror comprises any suitable flexible, nonbrittle, shatter proof material with the ability to snap back to the original flat position after being bent repeatedly. Polycarbonate thermoplastic resin comprises a preferred material for the mirror body 15. The reflective surface 13 should preferably contain a scratch or abrasion resistant surface film or coating available on a sheet-like polycarbonate product and is called Croylon AR™ which is available from Cyro Industries. This polycarbonate will not fracture and create sharp edges. Before fracturing and sharp edges are created, the mirror will ruin itself by creasing first. Croylon AR™ is polycarbonate with a silicone based abrasion resistant coating (not shown) applied to one side, which becomes the reflective surface 13 of mirror 10. The side of the polycarbonate without the silicone abrasion resistant coating has a vacuum metalized aluminum 20 applied to it and then an enamel coating 21 applied, covering the vacuum metalized aluminum. The reflective surface 13 may comprise any suitable reflective material available to the art such as the described vacuum metalized aluminum or a dielectric coating. The unreflective back surface 12 may have printing applied directly onto the enamel surface providing the surface will accept ink and then preferably is covered with a clear glossy plastic film, or be laminated or coated with any suitable material that resists tearing, smearing and scratching. Alternatively a plastic coated paper such as NeverTear™ 17 available from Xerox Corporation may be adhered to the back unreflective side of the plastic mirror using any suitable adhesive that does not significantly restrict the flexibility or snap back ability of the mirror body. The NeverTear™ coating readily accepts ink and is an ideal surface for the retention and presentation of indicia. A suitable adhesive comprises a double sided tape 16 available from 3M under the trade name 9485 PC. This allows an adequate amount of flexibility between the plastic and the sheet during bending. When using the NeverTear™ backing the enamel coating becomes optional and is not required. The unreflective surface 12 may contain any suitable indicia, and in the case of FIG. 2 illustrates a smiling face 14. It is to be understood that any suitable indicia may be added to the unreflective surface of the mirror, such as calendars, football schedules, advertising, or the like. The corners 11 should be rounded preferably to about ¼ of an inch radius and the edges should be continuous straight lines so as not to catch the wallet edges when inserting or removing.

The size of the mirror 10, should preferably be a width of about 2⅛ inches and a length of about 3⅜ inches. This is the standard size of most credit cards. The majority of credit card pockets are very small and room is very restricted, however, most can also accommodate a mirror slightly larger or slightly smaller. The width can be between 1⅞ inches and 2¼ inches and a length can be between 3¼ inches and 3⅝ inches. If the size is any smaller, then the mirror will tend to be lost in a credit card pocket, and if it is any larger, then in most wallets either the mirror will stick out, which would result in damage to the mirror, or the mirror would not fit into the wallet or not fit properly, causing damage to the wallet. Some credit card pockets are exceptionally large, and the absolute largest range that a credit card mirror can come in is a width between 1⅞ inches and 3 inches and a length between 3¼ inches to 3¾ inches. Preferably, the thickness of the mirror should not be greater than about 1/16 of an inch, but thickness up to about 3/32 inches can be used. It should be understood that the various layers or films 16, 17, 20 and 21 are not drawn to scale and that the sheet like mirror body 15 constitutes the component of greatest thickness.

FIGS. 4, 5, 6 and 7 illustrate a second embodiment of the invention having the same structure illustrated in FIGS. 1–3 in which a mirror having a plastic body 19 with little to no elasticity has a flat spring 18 (FIG. 6) positioned within the mirror structure to achieve the elasticity required for this application. Alternatively, the spring may simply be laid flat against the back of the mirror and adhered with an adhesive to provide the same effect.

Figure 6:
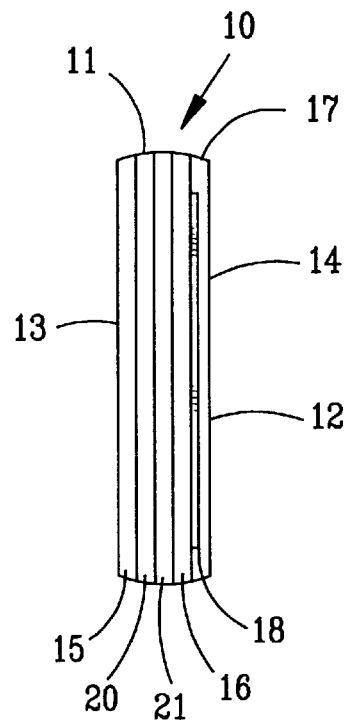
FIG. 6 is a side view of the mirror of FIG. 4.
Figure 7:
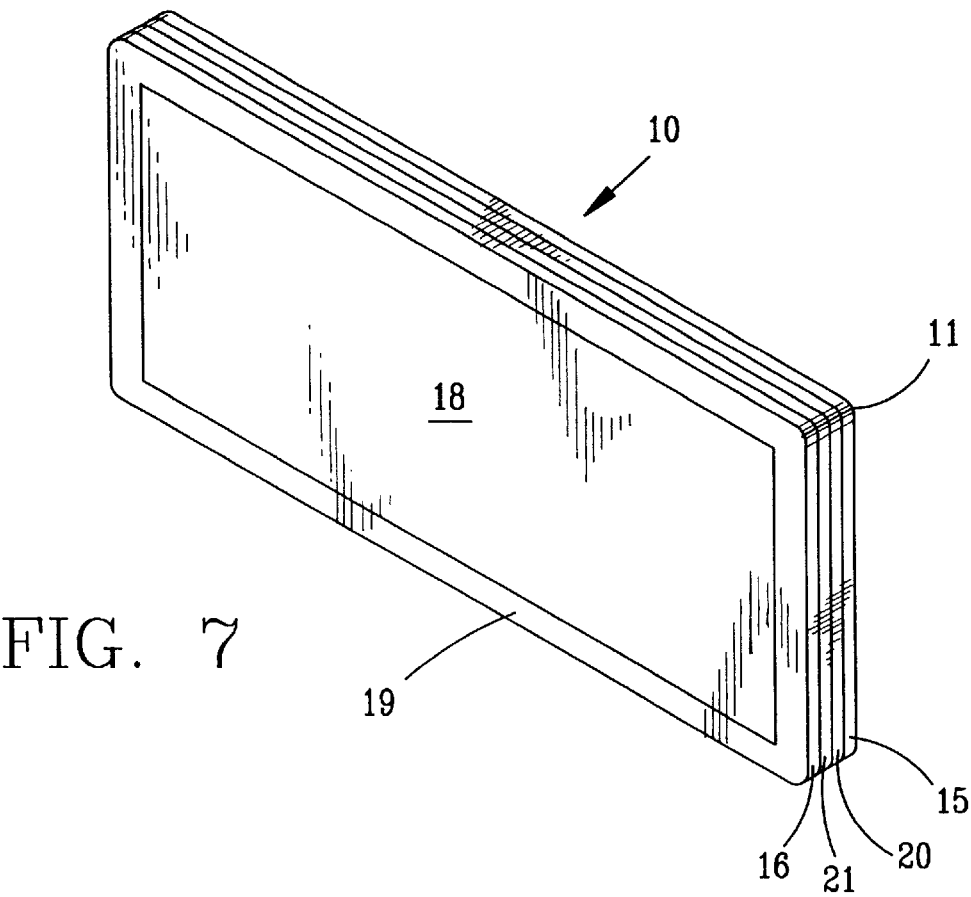
FIG. 7 is a back view of the mirror of FIG. 4 before the backing layer is applied.

In FIG. 6 a flat spring 18 which is made out of 1095 blue tempered 0.007 thick spring steel is adhered to a plastic body 19 with little to no snap-back ability such as polyvinyl chloride (PVC) or high impact styrene. The spring dimensions are less than that of the mirror and it is centered in the middle of the mirror so its edges do not extend beyond the mirror's edges as shown in FIGS. 6 and 7.

Although particular embodiments of the present invention have been disclosed herein for purposes of explanation, further modifications or variations thereof will be apparent to those skilled in the art to which this invention pertains.

What is claimed:

1. A portable mirror suitable for storage in a credit card pocket which comprises a generally rectangular sheet of flexible shatter resistant plastic;

a layer of reflective material on a first surface of the rectangular sheet;

a layer of enamel on the layer of reflective material;

a layer of adhesive on the layer of enamel;

a layer of unreflective ink receptive material on the layer of adhesive; and visible indicia on the ink receptive material;

said mirror having a substantially continuous rectangular surface, with said mirror having a thickness and size compatible with storage in a credit card pocket.

2. The mirror according to claim 1, further comprising a layer of abrasion, scratch resistant material on an opposite surface of the rectangular sheet.

3. The mirror according to claim 1, in which the plastic is a sheet a polycarbonate.

4. The mirror according to claim 1, in which the reflective material comprises a metallic film.

5. The portable mirror according to claim 1, wherein the reflective material is vacuumized metallized aluminum.

6. The portable mirror according to claim 1, wherein the thickness does not exceed 3/32 inch.

7. The portable mirror according to claim 1, wherein the mirror has rounded corners.

8. The portable mirror of claim 1, wherein the reflective material is a dielectric coating.

9. A portable mirror suitable for storage in a credit card pocket comprising:

a flexible shatter resistant, generally rectangular plastic sheet;

a layer of reflective material on a surface of the generally rectangular plastic sheet;

an enamel coating layer; and a layer of visible indicia;

wherein all of the layers and the generally rectangular plastic sheet are of equal size and imperforate and each of the layer of reflective material and the layer of visible indicia is substantially unobstructed so that a reflective area and an indicia bearing area each covering an entire surface of the mirror are provided;

the mirror having a substantially continuous rectangular surface, said mirror having a thickness and size compatible for storage in a credit card pocket;

the layer of reflective material and the layer of visible indicia being separated by at least the enamel coating layer;

wherein the thickness of the portable mirror does not exceed 3/32 inch.

10. The portable mirror of claim 9, wherein the flexible shatter resistant, generally rectangular plastic sheet is made from polycarbonate thermoplastic resin.

11. The portable mirror of claim 9, wherein the reflective material is vacuum metallized aluminum.

12. The portable mirror of claim 9, wherein the reflective material is a dielectric coating.

13. The portable mirror of claim 9, wherein the portable mirror has rounded corners.

14. The portable mirror of claim 9, further comprising an adhesive layer disposed between the layer of visible indicia and the layer of reflective material, the adhesive layer being imperforate and equal in size to the other layers.

15. A portable mirror suitable for storage in a credit card pocket comprising:

a flexible shatter resistant, generally rectangular plastic sheet;

a layer of reflective material on a surface of the generally rectangular plastic sheet;

an adhesive layer; and and a layer of visible indicia;

wherein all of the layers and the generally rectangular plastic sheet are of equal size and imperforate and each of the layer of reflective material and the indicia layer is substantially unobstructed so that a reflective area and an indicia bearing area each covering an entire surface of the mirror are provided;

the mirror having a substantially continuous rectangular surface, said mirror having a thickness and size compatible for storage in a credit card pocket;

the layer of reflective material and the layer of visible indicia being separated at least by the adhesive layer;

the thickness of the portable mirror not exceeding 3/32 inch.

16. The portable mirror of claim 15, further comprising a coating layer between the layer of reflective material on a surface of the generally rectangular plastic sheet and the adhesive layer.

17. The portable mirror of claim 16, wherein the coating layer is an enamel coating layer.

18. The portable mirror of claim 15, wherein the flexible shatter resistant, generally rectangular plastic sheet is made from polycarbonate thermoplastic resin.

19. The portable mirror of claim 15, wherein the reflective material is vacuum metallized aluminum.

20. The portable mirror of claim 15, wherein the reflective material is a dielectric coating.

21. The portable mirror of claim 15, wherein the portable mirror has rounded corners.

\* \* \* \* \*

UNITED STATES PATENT AND TRADEMARK OFFICE
CERTIFICATE OF CORRECTION

PATENT NO. : 6,142,640
DATED : November 7, 2000
INVENTOR(S) : Douglas P. Schofield It is certified that error appears in the above-indentified patent and that said Letters Patent is hereby corrected as shown below:

[63] Continuation of Application No. 08/330,305, Oct. 27, 1994

Signed and Sealed this

Twenty-ninth Day of May, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 6,142,640
DATED : November 7, 2000
INVENTOR(S) : Douglas P. Schofield It is certified that error appears in the above-identified patent and that said Letters Patent is hereby corrected as shown below:

[63] Continuation of application No. 08/330,305, October 27, 1994, abandoned, which is a continuation-in part of application No. 08/056,133, Apr. 30, 1993, abandoned, which is a continuation-in-part of application No. 07/953,924, Sep. 29, 1992, abandoned.

Signed and Sealed this

Twenty-eighth Day of August, 2001

*Attest:*

NICHOLAS P. GODICI
*Attesting Officer*    *Acting Director of the United States Patent and Trademark Office*